July 6, 1937.　　　F. F. ELLINGWOOD　　　2,086,493

MULTICOLORED ARTICLE AND METHOD OF PRODUCING IT

Filed March 3, 1933

INVENTOR
Finley F. Ellingwood
BY
ATTORNEY

Patented July 6, 1937

2,086,493

UNITED STATES PATENT OFFICE 2,086,493

MULTICOLORED ARTICLE AND METHOD OF PRODUCING IT

Finley F. Ellingwood, Metuchen, N. J., assignor to Bakelite Corporation, New York, N. Y., a corporation of Delaware Application March 3, 1933, Serial No. 659,509

10 Claims. (Cl. 18—59)

The invention relates to decorative articles, including articles for personal wear or use, such as bracelets, buttons, toilet articles, and the like, characterized by a plurality of colors. It relates more particularly to such articles which are cast or molded from materials in a fluent plastic condition and thereafter hardened to a non-plastic condition.

Plastic materials found particularly acceptable for decorative articles, are the resinous condensation products obtained from phenols and formaldehyde or equivalent substances. These resins while plastic can be cast or molded to any desired shape and are hardenable by heating to a non-plastic stage. When hardened the clear products have a transparency and high refractive index that render them especially attractive and desirable for articles of adornment. They have been further improved as to color and resistance to light whereby color effects of great variety and delicacy are made possible.

According to the present invention articles of variegated surface appearance are obtained through the medium of two or more colored resins or equivalent plastic materials that can be cast molded or otherwise shaped. In brief it comprises first preparing a body from a base material of one color and conformation, then casting, molding or otherwise disposing a second material of a different color in adhering contact with the base material, and simultaneously with that operation or subsequently thereto shaping the second material into a body of different conformation whereby portions of the first body are exposed and the color contrasts brought out in variegated surface patterns as desired.

In order that the invention may be more clearly understood it is herein described as applied to bracelets; but other applications are obvious and the invention is not to be construed as limited to these particular articles.

In the accompanying drawing.

The procedure followed in making the bracelets illustrated is to first cast or otherwise form a primary body for instance an annular cylinder from a material of one color while plastic and hardening the material sufficiently so that it is self supporting and a second primary body of a plastic material of another color can later be formed around it; in the casting or equivalent operation it can be given the desired cross section or contour or it can be subsequently machined to the desired form. The cylinder is then inserted in a suitable mold for casting a fluent material of contrasting color about it, or the plastic material can be pressed or otherwise formed into shape about the cylinder; the mass is then hardened to a unitary composite body. The hardened blank so obtained is cut into bands of desired width and the bands are machined to bring out the patterns desired; the machining into the final form can take place simultaneously with the cutting of the bands. The cylinders can be given the same or different peripheral conformations or cross sections in the casting or forming operations so that additional variegated surface appearances of different patterns are obtainable in the finished articles.

Figure 1:
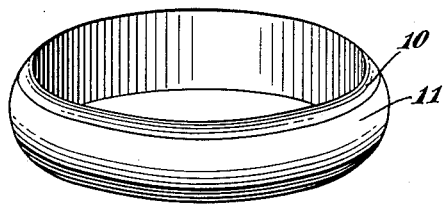
Fig. 1 is a perspective view of a bracelet.

For the embodiment shown in Fig. 1 an annular cylinder 10 of circular transverse cross section is cast. About this is then cast another annulus 11 of circular transverse cross section. The cylinder after hardening is cut into bands and these are machined into bracelets having a convex profile so as to leave a band of the annulus 11 about a wider band of the annulus 10.

Figure 2:
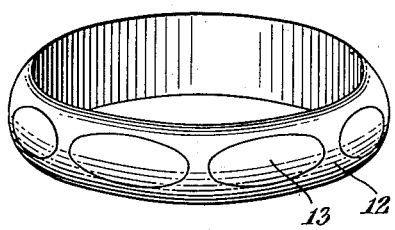
Fig. 2 is a perspective view of another form of bracelet.
Figure 3:
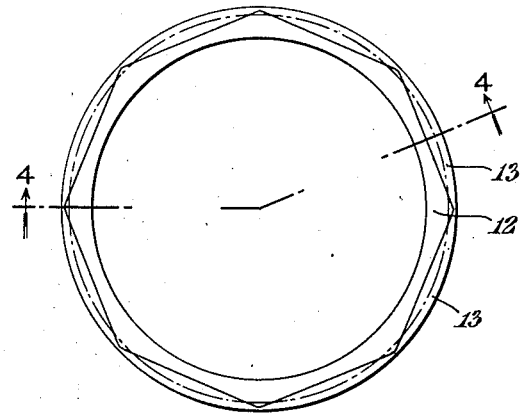
Fig. 3 is a top view of a blank from which the form shown in Fig. 2 is obtained.
Figure 4:
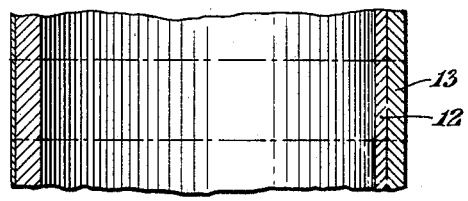
Fig. 4 is a cross section of Fig. 3.
Figure 5:
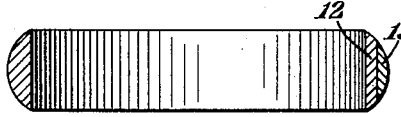
Fig. 5 is a cross section of the blank of Fig. 3 after a bracelet has been machined from it into the finished form shown in Fig. 2.

For the embodiment shown in Fig. 2 an annular cylinder 12 having a non-circular or polygonal transverse cross section or contour taken perpendicular to the axis of symmetry, is formed. About this is then formed another cylinder 13 of a different polygonal or circular transverse cross section which, as illustrated in Fig. 4 may have two axes of symmetry. When hardened and machined into an annulus with a convex profile as shown in cross section in Fig. 5 for example, the appearance in perspective as shown in Fig. 2 can be obtained.

Obviously varied effects can be obtained depending upon the relative thicknesses and conformations of the annular cylinders and the shapes into which the bracelets are formed. With a many sided polygonal interior portion and the whole machined into a circular band of convex profile for example, patterns in the form of round splotches or beads of one color on a background of another color are obtained in the finished article; with fewer sides to the interior cylinder, markings of oval contour are obtained. These markings are further varied by the profiles adopted; for instance grooves or ridges can be cut on the surface to impart further varieties of surface patterns. Thus variegated surface designs different from the surface of the original composite body may be obtained.

Instead of casting or forming a second annular cylinder about the first, the order can be reversed by casting or forming the second within the first. Furthermore cylinders can be cast or formed both within and without to give a plurality of color effects. Obviously also the castings or shapes can be in the form of individual blanks or bands of various shapes as dictated by the finished articles desired.

Suitable materials for the manufacture of these articles are, as indicated, the heat-hardenable plastic condensation products obtained from a phenol and formaldehyde or its equivalent in accordance with known practice. These materials upon hardening or partial hardening do not fuse when further heated and additional masses can therefore be poured or molded about them without affecting their configuration. The additional masses can be of the same or different compositions, and they need not necessarily be of a heat-hardenable nature. Nor is it essential that the preliminarily formed material be of the heat-hardenable character, though the sharpness in color contrast that is obtained indicates the desirability of using the heat-hardenable compositions for the purpose since the first color does not then bleed into the second.

The resinous or other materials used can have other materials included with them such as fillers, pigments, etc. to give different visual effects for instance opacity or translucency as well as color.

I claim:

1. Process of preparing a multicolored article which comprises forming a body from a plastic composition of one color into a predetermined shape, forming a second body of plastic composition of a different color about and adherently enclosing said first named body, dividing the composite structure into sections, and removing portions of a surface of the second body from a section to expose along three dimensional axes a plurality of separated portions of the first body on that surface and give a variegated surface design to the article.

2. Process of preparing a multicolored article which comprises forming a continuous body from a plastic composition of one color, machining the exterior surface of said body into a form of a character such that a second composition applied thereto can be removed in part to expose a plurality of portions of said surface, applying a second plastic composition of different color to enclose and contact the machined surface of the first body, and machining a surface of the composite mass so formed to expose portions of the first body along three dimensional axes on the surface and create a surface design dependent on the manner in which the surface is machined.

3. Process of preparing a multicolored article which comprises forming an annular cylinder by casting a heat-hardening phenol-aldehyde resin, machining the cylinder to form, placing the machined cylinder in the mold, casting a heat-hardening phenol-aldehyde resin of contrasting color and in fluid condition about the cylinder, hardening the cylindrical blank so prepared by heating, cutting the cylindrical blank into transverse sections, machining a section to remove portions of the second casting and to expose portions of the first enclosed casting to thereby yield a surface design of mutilcolored variegated appearance dependent upon the contour given in the machining operation.

4. Multicolored article comprising a heat-hardened phenol-aldehyde resin in annular form and an enclosing body of heat-hardened phenol-aldehyde resin of different color in adherent contact therewith, both resins showing surface in three dimensions.

5. Multicolored article presenting an annulus and comprising united plastic compositions of two different visual effects, the surface of the article showing portions of both compositions exposed along their three dimensional and transverse axes.

6. In a plastic composition product a continuous encircling body of plastic composition and an encircled body of plastic composition of contrasting visual effect, the two bodies being adherently connected and the surfaces of both bodies which are exposed being three dimensional.

7. Process of manufacturing an ornamented article comprising forming a self-supporting primary body having a symmetrical outline upon a section taken perpendicular to its principal axis, forming around said primary body a second primary body of a substance having a different visual effect, said last formed body having at least two axes of symmetry, the primary bodies forming a unitary composite body, and cutting the ornamental article from the composite body by cutting the surface of said composite body along three axes and exposing surfaces of the primary bodies in three dimensions.

8. Process of preparing a multicolored article which comprises forming a primary body into a predetermined shape from a plastic composition having a given visual effect, forming a second primary body of a plastic composition having a different visual effect and united to the first named body, one of the primary bodies being substantially around and about the other thereby forming a unitary composite body comprising the primary bodies, one of the primary bodies having salient portions formed thereon and the other having recessions formed therein to receive said salient portions and removing portions of the surface of the composite body by cutting along three dimensional axes at the salient portions to expose portions of the inner primary body along three dimensional axes to give a variegated surface design to the article.

9. Process of preparing a multicolored article which comprises forming a primary body into a substantially cylindrical shape from a plastic composition having a given visual effect, forming a second substantially cylindrical primary body of a plastic composition having a different visual effect united to the first named body, one of the primary bodies substantially surrounding the other thereby forming a unitary composite substantially cylindrical body comprising the primary bodies, and removing portions of the surface of the cylindrical composite body by cutting along three dimensional axes to expose portions of the inner primary body to give a variegated surface design to the article.

10. Process of preparing a multicolored article which comprises forming a primary body into a predetermined shape from a plastic composition having a given visual effect, forming a second primary body of plastic composition having a different visual effect united to the first named body, thereby forming a unitary composite body comprising the primary bodies, one of the primary bodies substantially surrounding the other, and one of the primary bodies having salient portions formed thereon and the other having recessions formed therein to receive said salient portions, dividing the composite structure into sections, and removing portions of the surface of the composite body by cutting along three dimensional axes at the salient portions to expose portions of the inner primary body along three dimensional axes to give a variegated surface design to the article.

FINLEY F. ELLINGWOOD.